July 25, 1967 L. E. BROBERG 3,332,336
BREATHER SYSTEM FOR A SEALED STORAGE STRUCTURE
Filed Aug. 22, 1966
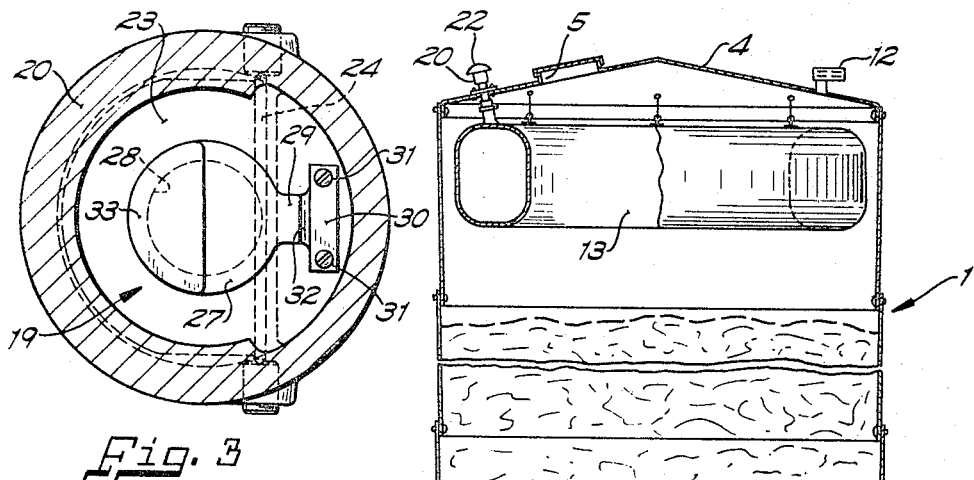
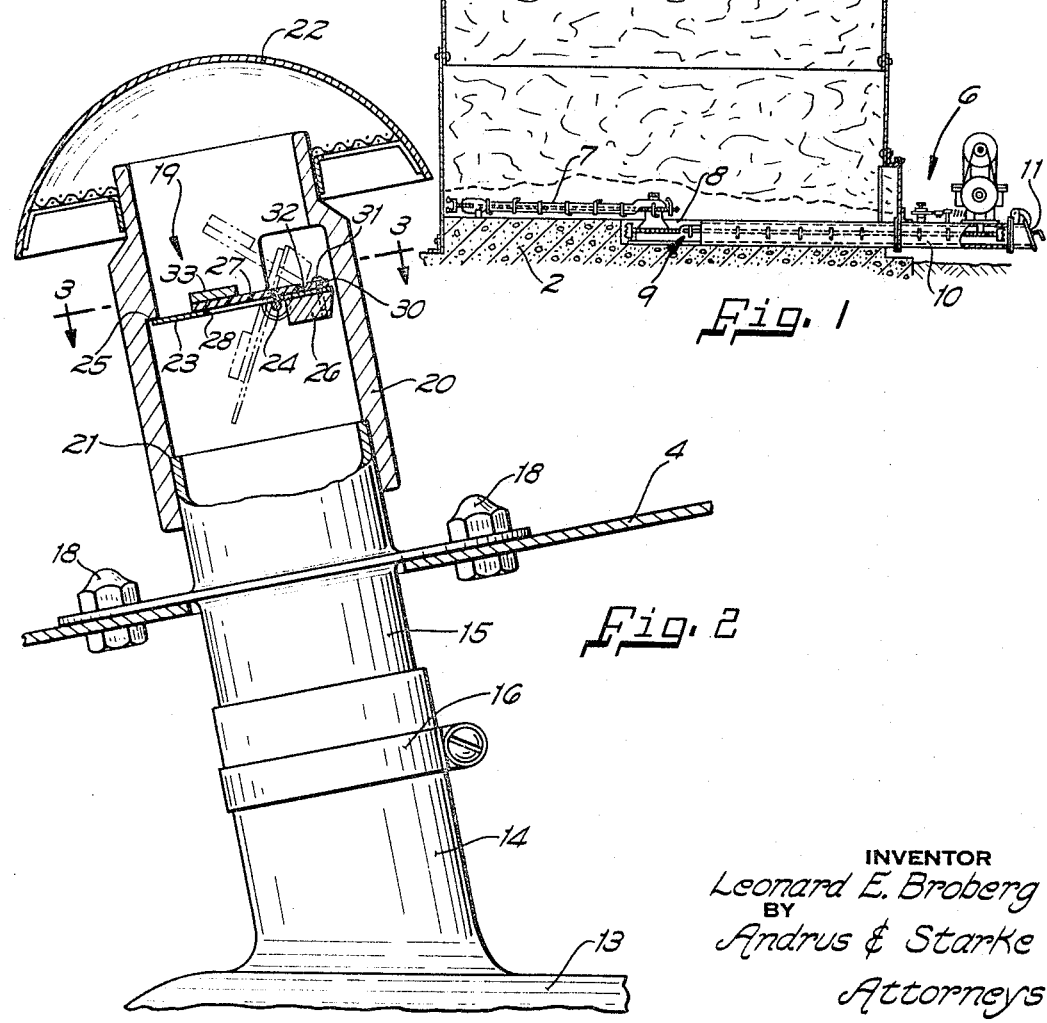
INVENTOR
Leonard E. Broberg
BY
Andrus & Starke
Attorneys

United States Patent Office 3,332,336
Patented July 25, 1967

3,332,336
BREATHER SYSTEM FOR A SEALED STORAGE STRUCTURE
Leonard E. Broberg, Milwaukee, Wis., assignor to A. O. Smith Harvestore Products, Inc., Arlington Heights, Ill., a corporation of Delaware
Filed Aug. 22, 1966, Ser. No. 574,100
12 Claims. (Cl. 99—235)

This invention relates to a breather system for a sealed storage structure and more particularly to a control valve mechanism to be associated with a breather bag in a sealed storage structure, such as a silo.

Perishable materials, such as silage, are frequently stored in an airtight or sealed silo to minimize contact with air and thereby prevent spoilage of the material. With a sealed storage structure or silo, the stored material is normally unloaded by a bottom unloading mechanism similar to that shown in the patent to Tiedemann 2,635,770. An unloader of this type includes a cutter arm which is mounted for rotation about the center of the silo and rotates over the foundation to dislodge the stored material and move the dislodged material to the center of the silo where it falls into a radially extending trough. A conveying unit operating within the trough moves the dislodged material to a housing on the exterior of the silo where it is discharged through a door to the exterior.

With the use of a sealed silo or storage structure, pressure differentials occur between the interior and the exterior of the silo due to the generation of gases, such as carbon dioxide, by the stored material and due to variations in ambient temperature and/or atmospheric pressure. As a large pressure differential between the interior and exterior of the silo can cause undue stress on the walls of the silo, a relief valve is normally employed in the roof of the silo. The relief valve is set to permit air to enter the silo from the atmosphere when a predetermined negative pressure differential is exceeded, meaning that when the pressure of the atmosphere exceeds the internal pressure by the pre-set amount, the valve will open to admit air to the silo. Similarly, the relief valve is set so that air is exhausted or vented from the interior of the silo when the pressure within the vessel exceeds the atmospheric pressure by a predetermined amount. In addition, a pressure responsive member, such as a breather bag, is located in the head-space of the silo and is employed to extend the range of volume changes between the extreme maximum and minimum pressure limitations. In the conventional system, a breather bag is located in the upper portion of the silo and the interior of the bag is connected through an opening in the silo roof to the atmosphere, while the exterior surface of the bag is subjected to the pressure within the silo. The breather bag serves to balance the interior pressure with the atmospheric pressure and yet prevents contact of the air with the stored material.

It has been found that in the early morning, the silo is normally at a negative pressure with respect to the atmosphere so that the breather bag is in an expanded condition. When the door of the unloader is opened to discharge silage, air flows in through the door to equalize the pressure between the interior of the silo and the exterior, and as the pressures are equalized, the breather bag tends to collapse. As the breather bag has a substantial volume, generally in the neighborhood of 300 to 600 cubic feet, the volume occupied by the expanded bag is replaced by air coming in through the unloader discharge door. Thus, as the bag collapses, a substantial quantity of air is drawn into the silo through the unloader discharge door and the entry of air will tend to destroy the desired oxygen-free gas composition in the silo.

The present invention is directed to a control valve mechanism associated with the outlet of the breather bag which retards the deflation of the breather bag and yet does not restrict or retard the inflation of the bag. More specifically, the neck of the breather bag is connected to the inner end of a tubular fitting which extends through the roof of the silo. The control valve mechanism is located within the fitting and includes a large, counterweighted flap valve which permits the flow of air inwardly into the bag but prevents the flow of air outwardly to the atmosphere. Located across an opening in the large flap valve is a smaller, counterweighted flap valve which permits the exhaust of air from the bag to the atmosphere but prevents the flow of air in the opposite direction. The larger flap valve is set or counterweighted to open to admit air into the bag when the pressure differential between the atmosphere and the interior of the bag is very small, while the smaller flap valve is counterweighted to open to exhaust air from the bag when the pressure differential between the atmosphere and the interior of the bag is some value approaching but not exceeding the relief valve setting.

In operation, when the unloader door is opened and air rushes into the silo to equalize the pressure, the flow of air outwardly from the bag is delayed due to the counterweighted setting of the smaller flap valve so that the deflation of the breather bag is substantially retarded. This reduces the amount of air which is taken in through the unloader discharge opening and thereby tends to maintain the inert gas composition in the silo. While the flow of air outwardly from the bag to the atmosphere is retarded, the flow of air in the opposite direction to inflate the bag is not retarded so that the bag can freely expand if the pressure within the silo is negative with respect to the atmosphere.

The present invention retards the deflation of the breather bag when the silo is open for unloading purposes and thereby minimizes the amount of air which is drawn into the silo during the unloading cycle.

Other objects and advantages will appear in the course of the following description.

The drawings illustrate the best mode presently contemplated of carrying out the invention.

In the drawings:

FIG. 1 is a vertical section of an airtight storage structure incorporating the valve control mechanism of the invention;

FIG. 2 is a vertical section of the valve control mechanism, and

FIG. 3 is a section taken along line 3—3 of FIG. 2.

The drawings illustrate a sealed storage structure or silo 1 which is adapted to contain a perishable material such as silage, or the like. The silo 1 is supported on a foundation 2 and includes a generally cylindrical wall or shell 3 having an open top which is enclosed by a roof 4. The stored material or silage is loaded into the silo 1 through an opening 5 in the roof, and an unloader unit 6 is located in the bottom of the silo and serves to remove the silage from the silo. The unloader unit 6 can be similar to that disclosed in the Tiedemann Patent 2,635,770 and includes a cutter arm 7 which is mounted for rotation at the center of the silo and serves to cut or dislodge the silage and move the dislodged silage to the center of the silo where it falls into a radially extending trough 8 formed in the foundation 2. A conveyor unit 9 is mounted within the trough and extends within a housing 10 on the exterior of the silo. The conveyor unit 9 operates to move the dislodged sliage outwardly to the housing 10 where it is discharged through an opening enclosed by a cam-locked door 11.

As pressure differentials occur between the interior of the silo 1 and the atmosphere due to the generation of gases by the stored material and due to ambient temperature and pressure changes, a relief valve 12 is mounted in the roof 4 and functions as a safety measure to prevent excessive pressure differentials. The relief valve 12 operates between a minimum and maximum pressure differential and when the pressure within the silo exceeds the atmospheric pressure by a predetermined amount, the relief valve will open to permit the flow of air outwardly to the atmosphere. Conversely, the relief valve is set so that when the atmospheric pressure exceeds the pressure within the silo 1 by a predetermined amount, the relief valve will open to permit atmospheric air to enter the silo. For example, the relief valve in a typical airtight silo may be set to open to permit air to enter the silo when a negative pressure differential of —1.5 inches of water is exceeded and is set to open to exhaust air to the atmosphere when a positive pressure differential of +3.5 inches of water is exceeded.

In addition, a breather bag 13 is supported by cables, not shown, within the upper portion of the silo 1 beneath the roof 4 and serves to extend the range of volume changes resulting from pressure changes falling within the minimum and maximum levels determined by the relief valve 12. As best shown in FIG. 2, the breather bag has a generally doughnut shape and is provided with a neck 14 which is secured around the lower end of a tubular fitting 15 by a split ring clamp 16. To secure the fitting into the roof 4, the fitting is provided with an outwardly extending flange 17 which is secured to the roof panels by a series of bolts 18.

According to the invention, a control valve mechanism 19 is housed within a sleeve 20 which is mounted on the outer end of the fitting 15. The lower end of sleeve 20 is provided with an internal shoulder 21 which rests on the upper end of fitting 15. The outer end of sleeve 20 has a reduced external diameter and receives a conventional cap 22 which prevents rain and other foreign material from entering the sleeve 20.

The control valve mechanism 19 includes a large flap valve 23 which is secured to a horizontal pin or shaft 24 journalled within openings formed in opposite portions of the sleeve 20. The central portion of sleeve 20 is provided with an internal shoulder 25 and the peripheral margin of the flap valve 23 is urged into contact with the shoulder 25 by a weight 26 which is secured to the under surface of the flap valve. The weight 26 tends to pivot the flap valve 23 around the shaft 24 and urges the periphery of the valve into contact with the shoulder 25.

In addition to the flap valve 23, the valve mechanism 19 also includes a second smaller flap valve 27 which is adapted to open and close an opening 28 in the flap valve 23. Valve 27 is provided with a neck or extension 29 terminating in an enlarged end 30 which is secured to the flap valve 23 by a pair of screws 31. To permit the flap valve 27 to pivot upwardly, the neck 29 is provided with a notch 32 which serves as a hinge and enables the flap valve 27 to pivot with respect to the flap valve 23.

The flap valve 27 has a greater diameter than the opening 28 in flap valve 23 and the peripheral edge of the valve 27 is urged downwardly into contact with the flap valve 23 by a weight 33 which is secured to the upper surface of the valve 27.

The size of the flap valves 23 and 27, as well as the weights 26 and 33, are adjusted so that the flap valve 23 will open to permit the flow of air inwardly to the breather bag when a very small pressure differential occurs between the atmosphere and the interior of the bag, meaning that the atmospheric pressure exceeds the pressure within the bag by a slight amount. The pressure required to open the smaller flap valve 27 is considerablby greater, and it is designed so that it will open to exhaust air when the pressure within the bag exceeds the atmospheric pressure by a pre-set amount approaching but not exceeding, the setting of the relief valve. With this construction, air can flow from the atmosphere into the bag, when the interior of the silo is at a negative pressure with respect to the atmosphere, without any appreciable resistance to its flow. However, the flow of air outwardly from the bag to the atmosphere, when the pressure within the silo is positive with respect to the atmosphere, is substantially retarded and no outward flow of air will occur until the pressure differential exceeds the preset value.

In the early morning, the interior of the silo is normally at a negative pressure with respect to the atmosphere and the breather bag 13 is thus in an expanded condition. When the unloader is operated and the door 11 is opened, air will rush in through the door to equalize the pressure between the interior and exterior of the silo. As the pressure is equalized, the breather bag 13 will deflate under its own weight and the volume formerly occupied by the expanded bag will be replaced by air being drawn in through the door 11. As the breather bag has a substantial volume, a large volume of air will be drawn into the silo during each unloading operation, and this will adversely affect the desired airtight characteristics of the silo. However, with the use of the control valve mechanism 19 of the invention, the outward flow of air from the breather 13 is retarded so that the bag will not immediately deflate and thus, the quantity of air drawn into the silo through door 11 during the unloading cycle will be substantially reduced. With a conventional airtight silo employing a 300 cubic foot breather bag, it has been found that the deflation of the breather bag due to the equalizing of pressure during the unloading cycle will result in about 140 cubic feet of air being drawn into the silo through the door 11 in a period of 15 minutes. However, by using the control valve mechanism of the invention, in which the deflation of the bag is retarded, only about 40 cubic feet of air will be drawn into the silo within the same 15-minute period. Thus, the present invention substantially reards the deflation of the breather bag when the silo is opened for unloading and thereby minimizes the amount of air drawn into the silo during the unloading cycle.

As the control valve mechanism 19 is contained in the separate sleeve 20, it can be installed with a conventional silo, without alteration of the silo, by merely removing the cap from the fitting 15, inserting the sleeve 20 on the fitting and then positioning the cap on the upper end of the sleeve.

Various modes of carrying out the invention are contemplated as being within the scope of the following claims particularly pointing out and distinctly claiming the subject matter which is regarded as the invention.

I claim:

1. In a sealed storage structure having an unloading unit located within the structure and disposed to discharge the stored material through a discharge opening in the structure, a flexible pressure responsive member located in the upper portion of the storage structure and dividing the storage structure into a first chamber communicating with the stored material and into a second chamber, conduit means extending through the wall of the structure and providing communication between the atmosphere and said second chamber, one surface of said pressure responsive member being exposed through said conduit means to the atmosphere and the other surface of said pressure responsive member being exposed to the pressure within said storage structure, and control means associated with said conduit means for effecting a slower rate of air flow outwardly from said second chamber to the atmosphere than inwardly from the atmosphere to said second chamber.

2. The structure of claim 1 in which said pressure responsive member is a bag having an opening therein and said opening is connected to said conduit means.

3. The structure of claim 2 in which said control means is a valve mechanism disposed in said conduit means and including a first valve member responsive to a first positive pressure differential between the atmosphere and the interior of the bag to open said conduit means and admit air to said bag and said valve mechanism includes a second valve member responsive to a second negative pressure differential between the atmosphere and the interior of the bag to open said conduit means and permit the flow of air outwardly through said conduit means to the atmosphere.

4. The structure of claim 3 in which the magnitude of said second negative pressure differential is greater than the magnitude of said first positive pressure differential.

5. The structure of claim 3, and including counterweight means connected to said valve members for biasing each valve member to the closed position.

6. The structure of claim 3, in which the first valve member is disposed to open and close said conduit means and is provided with an opening, and said second valve member is disposed to open and close the opening in said first valve member.

7. The structure of claim 6, in which both valve members are mounted for pivotal movement about parallel axes and said axes are disposed generally perpendicular to the axis of said conduit means.

8. The structure of claim 2, in which said conduit means is a tubular fitting extending through the wall of the structure and the opening in said bag is connected to the inner end of the fitting and said control means is associated with the outer end of the fitting and is located on the exterior of the structure.

9. The structure of claim 8, in which the control means is disposed with a hollow member attached to the outer end of said tubular fitting.

10. The structure of claim 1 in which said control means acts to retard the outward flow of air through said conduit means and acts to provide a substantially free flow of air inwardly through said conduit means.

11. In a sealed storage structure having an unloading unit located within the structure and disposed to discharge the stored material through a discharge opening in the structure, a flexible pressure responsive member located in the upper portion of the storage structure and dividing the storage structure into a first chamber communicating with the stored material and into a second chamber, conduit means extending through the wall of the structure and providing communication between the atmosphere and said second chamber, one surface of said pressure responsive member being exposed through said conduit means to the atmosphere and the other surface of said pressure responsive member being exposed to the pressure within said storage structure, first check valve means connected in said conduit means for permitting the outward flow of air from said second chamber to the atmosphere and for preventing the inward flow of air from the atmosphere to said second chamber, means associated with said first check valve means for retarding the opening of said first check valve means until a substantial predetermined pressure differential between said second chamber and the atmosphere is exceeded, and second check valve means connected in said conduit means for permitting the substantially free inward flow of air from the atmosphere to said second chamber and for preventing the outward flow of air from said second chamber to the atmosphere.

12. In a hermetically sealed storage structure having an unloading unit located within the structure and disposed to discharge the stored material through a discharge opening in the structure, a flexible pressure responsive bag located in the upper end of the structure and having an opening therein, a tubular member extending through the wall of the structure and having the inner end thereof communicating with the opening in the bag and having the outer end exposed to the atmosphere, a control valve mechanism disposed within the tubular member and including a first valve member responsive to a first positive pressure differential between the atmosphere and the interior of the bag to open said tubular member and admit air to said bag and said valve mechanism includes a second valve member responsive to a second negative pressure differential between the atmosphere and the interior of the bag to open said tubular member and permit the flow of air outwardly through said conduit means to the atmosphere, the magnitude of said second negative pressure differential being substantially greater than the magnitude of said first positive pressure differential whereby the deflation of the bag will be retarded when the discharge opening is opened to discharge the stored material.

References Cited

UNITED STATES PATENTS

| 2,635,770 | 4/1953 | Tiedemann | 214—17 |
| 2,643,602 | 6/1953 | Martin | 99—235 |
| 3,125,014 | 3/1964 | Herbruck | 99—235 |
| 3,193,058 | 7/1965 | Ebbinghaus | 99—235 |

WALTER A. SCHEEL, *Primary Examiner.*

R. W. JENKINS, *Assistant Examiner.*